United States Patent
Falk-Pettersen et al.

(10) Patent No.: US 10,474,152 B2
(45) Date of Patent: Nov. 12, 2019

(54) PATH-BASED FLIGHT MANEUVERING SYSTEM

(71) Applicant: FLIR Unmanned Aerial Systems AS, Hvalstad (NO)

(72) Inventors: Erik Falk-Pettersen, Oslo (NO); Ola Roer Thorsen, Krokkleiva (NO); Petter Muren, Nesbru (NO)

(73) Assignee: FLIR UNMANNED AERIAL SYSTEMS AS, Hvalstad (NO)

( * ) Notice: Subject to any disclaimer, the term of this patent is extended or adjusted under 35 U.S.C. 154(b) by 218 days.

(21) Appl. No.: 15/561,448

(22) PCT Filed: Mar. 23, 2016

(86) PCT No.: PCT/EP2016/056311
§ 371 (c)(1),
(2) Date: Sep. 25, 2017

(87) PCT Pub. No.: WO2016/150987
PCT Pub. Date: Sep. 29, 2016

(65) Prior Publication Data
US 2018/0120846 A1    May 3, 2018

(30) Foreign Application Priority Data

Mar. 25, 2015    (NO) .................................. 20150381

(51) Int. Cl.
*G05D 1/00*    (2006.01)
*G06F 7/00*    (2006.01)
(Continued)

(52) U.S. Cl.
CPC .......... *G05D 1/0094* (2013.01); *G05D 1/0016* (2013.01); *G05D 1/0038* (2013.01); *G05D 1/101* (2013.01); *G06F 3/033* (2013.01); *H04N 5/23203* (2013.01); *H04N 5/23216* (2013.01); *H04N 5/23293* (2013.01);
(Continued)

(58) Field of Classification Search
None
See application file for complete search history.

(56) References Cited

U.S. PATENT DOCUMENTS

| 5,606,627 | A | 2/1997 | Kuo |
| 2002/0022909 | A1 | 2/2002 | Karem |

(Continued)

FOREIGN PATENT DOCUMENTS

WO    WO 2013/163746    11/2013

OTHER PUBLICATIONS

Kang et al., "Recovering an elevation map by stereo modeling of the aerial image sequence", Optical Engineering, Nov. 1994, pp. 3793-3802, vol. 33, No. 11, SPIE, Bellingham, WA.
(Continued)

*Primary Examiner* — Bhavesh V Amin
(74) *Attorney, Agent, or Firm* — Haynes and Boone, LLP

(57) ABSTRACT

The presented embodiments relates to a path-based flight maneuvering system and a method for providing easier operation control and enhanced operation capability of unmanned aerial vehicles and their associated features. The embodiments further entails a method for maneuvering an aircraft by means of a positioning device, a camera and a display displaying an image captured by the camera including a cursor projected on the image in the display.

20 Claims, 10 Drawing Sheets

(51) Int. Cl.
   *G05D 1/10* (2006.01)
   *G06F 3/033* (2013.01)
   *H04N 5/232* (2006.01)
   *B64C 39/02* (2006.01)
   *H04N 5/33* (2006.01)
(52) U.S. Cl.
   CPC ...... *B64C 39/024* (2013.01); *B64C 2201/108* (2013.01); *B64C 2201/127* (2013.01); *B64C 2201/141* (2013.01); *B64C 2201/146* (2013.01); *H04N 5/33* (2013.01)

(56) References Cited

U.S. PATENT DOCUMENTS

| | | |
|---|---|---|
| 2003/0118213 A1 | 6/2003 | Parker |
| 2003/0216834 A1 | 11/2003 | Allard |
| 2005/0273259 A1 | 12/2005 | Qwarfort et al. |
| 2010/0228406 A1 | 9/2010 | Hamke et al. |
| 2013/0176423 A1 | 7/2013 | Rischmuller et al. |
| 2014/0313332 A1 | 10/2014 | Sabe et al. |

OTHER PUBLICATIONS

Quigley et al., "Target Acquisition, Localization, and Surveillance Using a Fixed-Wing Mini-UAV and Gimbaled Camera", Robotics and Automation, 2005, pp. 2600-2605, Proceedings of the 2005 IEEE International Conference on Robotics and Automation, IEEE, Piscataway, NJ.

Crouse, Joshua D., "Development of Cursor-on-Target Control for Semi-Autonomous Unmanned Aircraft Systems", Thesis, Jun. 2007, pp. 1-69, Air Force Institute of Technology, Wright-Patterson AFB, OH.

Valimont et al., "Look Where I'm Going and Go Where I'm Looking: Camera-Up Map for Unmanned Aerial Vehicles", Human-Robot Interaction (HRI), 2011, pp. 275-276, 2011 6th ACM/IEEE International Conference on Human-Robot Interaction (HRI), IEEE, Piscataway, NJ.

PATH-BASED FLIGHT MANEUVERING SYSTEM

CROSS-REFERENCE TO RELATED APPLICATIONS

This patent application is a U.S. National Stage Patent Application under 35 U.S.C. 371 of International Patent Application No. PCT/EP2016/056311, filed Mar. 23, 2016 and entitled "PATH-BASED FLIGHT MANEUVERING SYSTEM," which claims priority to and the benefit of Norway Patent Application NO20150381, filed Mar. 25, 2015 and entitled "PATH-BASED FLIGHT MANEUVERING SYSTEM," which are all hereby incorporated by reference in their entirety.

TECHNICAL FIELD

Embodiments herein relate to a path-based flight maneuvering system and a method for providing easier operation control and enhanced operation capability of unmanned aerial vehicles and their associated features.

BACKGROUND

Unmanned Aerial Vehicles (UAVs) is used in a wide range of applications, both civilian and military, including inspection, intelligence, reconnaissance and rescue missions. UAV designs range from large fixed wing jets to smaller rotary wing aircraft with one or more rotors. Progress in the electronics industry over the past decades has made it possible to shrink the components necessary for an UAV system to become palm sized, Micro Air Vehicle (MAV). These vehicles can, for example, lift a camera and transmit images, while still being highly maneuverable. The size and maneuverability make MAVs an ideal tool for close range applications, e.g. reconnaissance, inspection and surveillance.

Historically, maneuvering an UAV required a pilot with a remote control and visual confirmation, similar to operating a conventional radio controlled helicopter or airplane. Modern UAVs, however, operate over longer distances and in all environments, rural or urban. Control of a modern UAV therefore rely on transmission from onboard sensors and computing capabilities to a remote unit, containing a display feature, which is operated by the pilot. This, in a first instance, made it possible for the pilot to maneuver the aircraft with a conventional remote control through the received images. Several solutions also utilize the positioning sensors so to make it possible to operate the UAV through a map and waypoint navigation system to achieve an autonomous or semi-autonomous control. The aircrafts flight path may then be generated by setting flight data in association to waypoints on a remote unit before, or even during, a mission. By virtue of a Global Positioning System (GPS) and/or other positioning capabilities, the onboard computing capabilities, known as the autopilot, may then navigate to the waypoint and continue their path to the next waypoint, without any further input necessary. If the pilot observes an object of interest, it is possible for the pilot to set more local waypoints or flightpaths on the go, for example to circle around a building.

An autopilot system is a physical hardware with pre-programmed software that aid in maneuvering modern day remote controlled helicopters and UAVs. The commands to maneuver the aircraft provided by the pilot is received by the autopilot system, and further translated in to actual movement of the aircraft. The autopilot system can also be set up to make independent maneuvers to counteract external factors, as for example wind, or to navigate a predefined path as mentioned. To be able to do this, the autopilot system is dependent on sensor capabilities, which sensor capabilities make the autopilot capable of determining among other vertical and horizontal speed, orientation and the aircrafts position. Coupled with camera features, the autopilot may also be set up to maneuver and monitor the position of the camera. An autopilot system is included in one form or another in almost all modern day remote controlled helicopters and UAVs.

For better operational abilities, mechanic and/or electronic pan and tilt functions have been implemented on the image sensors. These make it possible for the pilot to move the image to focus on a point of interests (POI), independent of the aircraft's flight path and general heading. However, if a pilot depends on the received images to navigate the aircraft, moving the image to view POIs reduce the visual control the pilot have of the aircraft's heading. Setting the flight height and/or waypoints clear of potential obstacles addresses this issue, but this again limits the local observational capabilities and flexibility of UAVs. Setting waypoints or defining flightpaths is also time-consuming, and rely on the pilot having sufficient geo-data present to avoid a compromising situation.

The nature of MAVs imply that they is used to get a real-time overview around, ahead or of a POI in proximity of the pilot. MAVs is often operated under highly stressful conditions in all types of locations and topographies, in ever changing situations. Employing a conventional remote control for the aircraft and camera system or an autonomous system in these situations entails that the aircraft in real life needs to be in a hover state or on a path and/or at a height clear of any possible obstacles to be practical in use. Hence, severely limiting the observational capabilities of the UAV.

Therefore, there is a need for an adaptable system that can simplify the operation of UAVs without compromising the observational capability, flexibility and the support function they may provide.

SUMMARY

An objective of the embodiments herein is to overcome or at least alleviate the above mentioned disadvantages. This object and other objects is achieved by the independent claims enclosed herein.

According to an aspect, the objective may be achieved by a method for maneuvering an aircraft by means of a positioning device, a camera and a display displaying an image captured by the camera including a cursor projected on the image in the display, wherein the method comprises the steps:

determining whether the aircraft is in a first or a second flight mode, capturing a current position of the aircraft by the positioning device, determining a current target point corresponding to an image point to which the cursor currently is pointing in the image.

providing a current direction from the current position directed towards the current target point, when the aircraft is determined to be in the first flight mode, then maneuvering the aircraft on a flight path defined from the current position along the current direction with a speed according to a speed control signal, allowing the camera to tilt and/or pan freely without affecting the maneuvering of the aircraft.

when the aircraft is determined to be in the second flight mode, then dynamically maneuvering the aircraft on a flight path from a consecutively changing current position along a consecutively changing current direction with a speed according to a speed control signal.

In one embodiment, the method for maneuvering an aircraft further comprises that the speed control signal is provided by control signals representative of throttle.

In one embodiment, the method for maneuvering an aircraft further comprises that the speed control signal is automatically provided.

In one embodiment, the method for maneuvering an aircraft further comprises that the whole aircraft yaws in order to pan the camera.

In one embodiment, the method for maneuvering an aircraft further includes the step of:

activating and/or switching between the first and/or the second mode by means of a mode activation device.

In one embodiment, the method for maneuvering an aircraft further comprises that the cursor has a fixed position within the display or is movable within the display.

In one embodiment, the autopilot system is further adjusted to maneuver an aircraft, the aircraft further includes a positioning device and a camera and communicates with a display displaying an image captured by the camera including a cursor projected on the image in the display, wherein a first determining means adjusted to determine whether the aircraft is in a first or a second flight mode, that the positioning device is adjusted to capture a current position of the aircraft, a second determining means adjusted to determine a current target point corresponding to an image point to which the cursor currently is pointing in the image, a direction provisioning device providing a current direction from the current position directed towards the target point, when the first determining means has determined the aircraft to be in the first flight mode, then the autopilot is adjusted to:

maneuvering the aircraft on a fixed flight path from the current position along the current direction with a speed according to a speed control signal, and allowing the camera to tilt and/or pan freely without affecting the maneuvering of the aircraft.

when the first determining means has determined the aircraft to be in the second flight mode, then the autopilot is adjusted to dynamically maneuvering the aircraft by consecutively changing the flight path according to the current position and the current direction.

In one embodiment, the autopilot system further comprises that the speed control signal is provided by actuating a throttle.

In one embodiment, the autopilot system further comprises that the speed control signal is automatically controlled by the autopilot.

In one embodiment, the autopilot system further comprises that the whole aircraft yaws in order to pan the camera.

In one embodiment, the autopilot system further comprises:

a mode activation device adjusted to activate and/or switch between the first and/or the second mode.

In one embodiment, the autopilot system further comprises that the cursor has a fixed position within the display or is movable within the display.

DETAILED DESCRIPTION

Embodiments disclosed herein relates to a path-based flight maneuvering system and a method for providing easier operation control and enhanced operation capability of an unmanned aerial vehicle (UAV) and its associated features. In the following, example embodiments will be described by referring to the accompanying drawings.

Figure 1A:
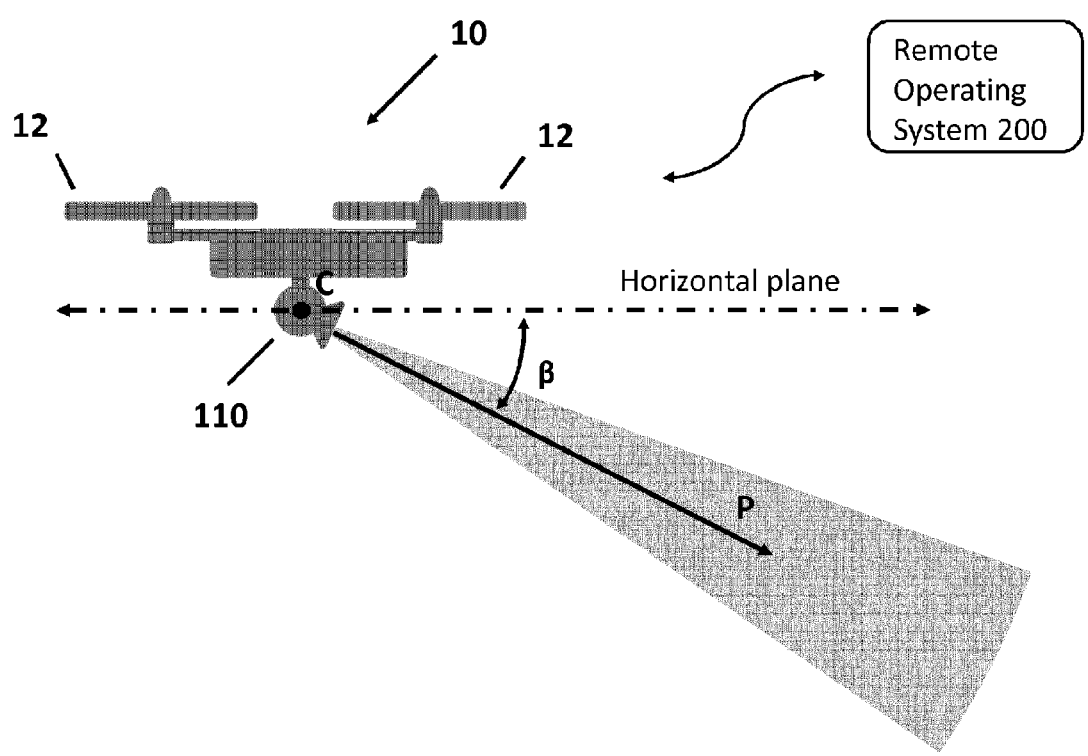
FIG. 1a schematically illustrates embodiments of an UAV system according to one example embodiment, seen from the side, with a horizontal plane through the center of the camera. The camera direction is illustrated as pointing down at the angle $\beta$.
Figure 1B:
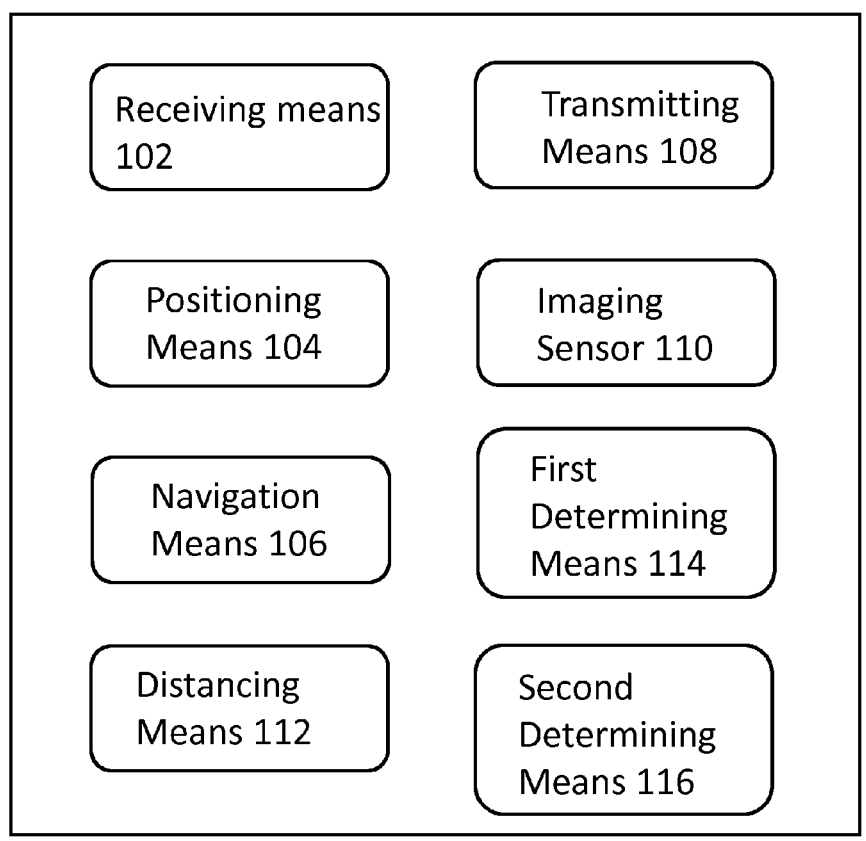
FIG. 1b schematically illustrates the capabilities comprised within the UAV system.
Figure 1C:
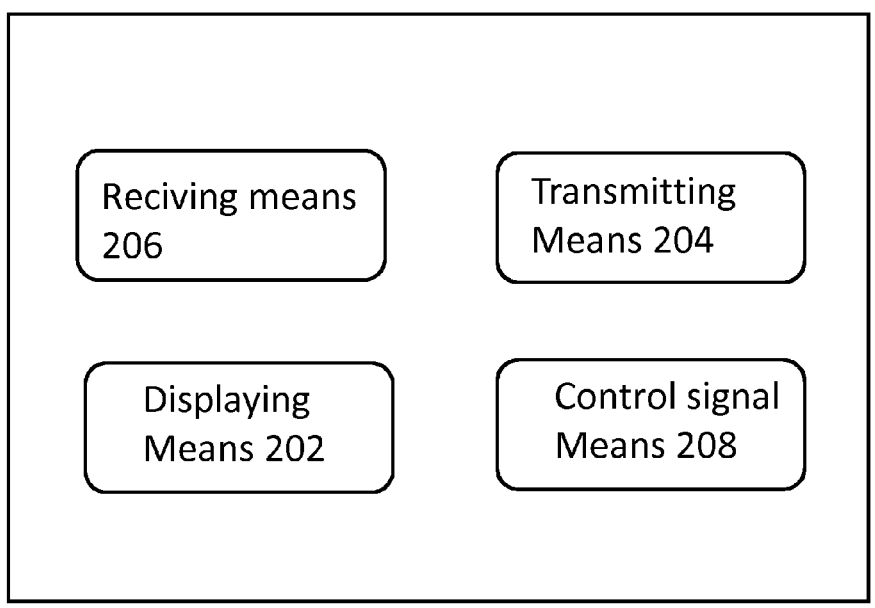
FIG. 1c schematically illustrates the capabilities comprised within the remote operating system.

Further, the present invention relates to an aircraft with one or more rotors making it capable of stationary hover or flight in any direction. Such an aircraft is sometimes herein referred to as a rotary wing UAV or simply the UAV. FIG. 1a schematically illustrates embodiments of an aircraft 10 comprising one or more rotors 12. A pilot operates the aircraft 10 via a remote operating system 200, which is schematically illustrated in FIGS. 1a and 1c.

Figure 7A:
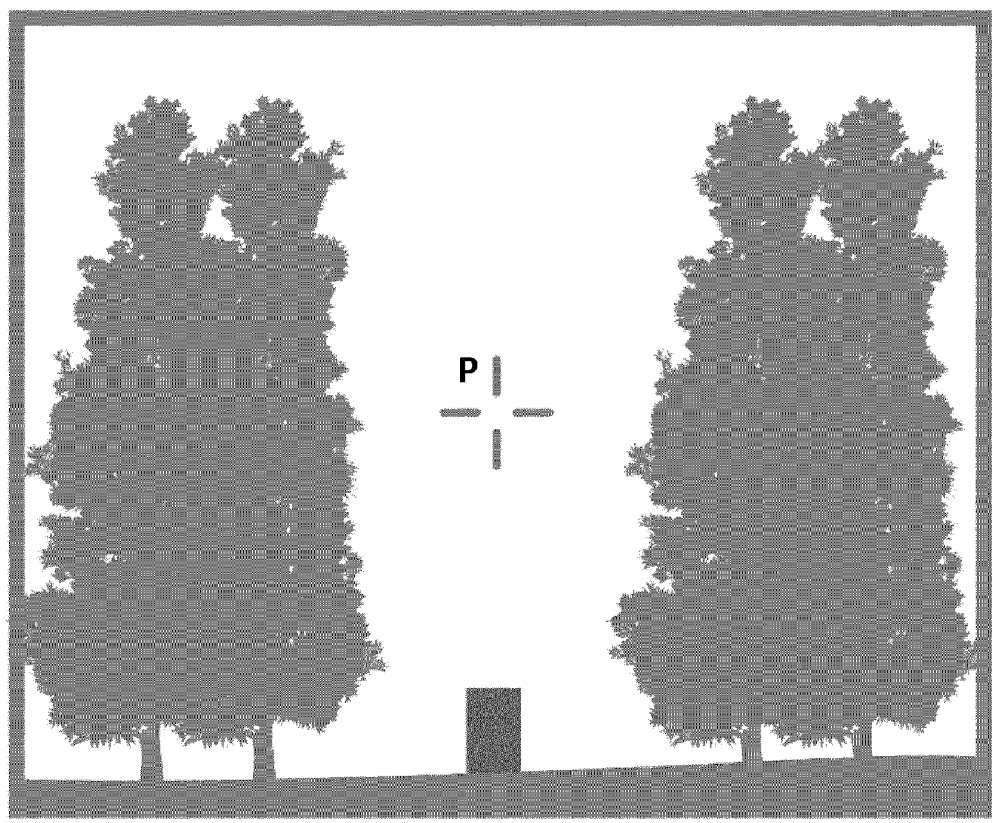
FIG. 7a schematically illustrates an example of the received images from the UAV system as viewed on a display associated with the remote operating system according to one example embodiment.

The remote operating system 200 comprises at least, but is not limited to, a display 202, transmitting and receiving means 204, 206, respectively, and means for providing control signals 208 representative of pan, tilt, throttle forward, throttle reverse and flight mode selection. In one embodiment of the invention, the pan and tilt control signals means described may be thought of as corresponding to the joysticks utilized to provide turn left, turn right, tilt up and tilt down actions of a traditional remote controlled aircraft. The remote operating system 200 is configured to transmit a control signal to the aircraft 10 through wireless communication. The center of the display 202 is indicated by a fixed or moveable cursor, which also may be thought of as illustrating the target point within the display. FIG. 7*a* illustrates a cursor according to the present example embodiment in the style of a crosshair.

The UAV 10 comprises a UAV system 100. The UAV system 100 comprises receiving means 102, positioning means 104 and navigation means 106 adapted to i.a. receive and interpret a control signal. As previously mentioned, the control signal is transmitted from the remote operating system 200 to the aircraft 10 and especially to the receiving means 102 of the UAV system 100. The navigation means is further configured to translate the interpreted control signal from the remote operating system 200 to relative movements of the aircraft 10 representative of the control signals provided by the pilot.

Further, the UAV system 100 comprises of one or more imaging sensors 110 and transmitting means 108. The transmitting mean 108 is adapted to transmit data from relevant onboard means, including the one or more imaging sensors 110, to a remote display, e.g. to the displaying means 202 of the remote operating system 200. The transmission of data may be performed in real-time. The at least one imaging sensor 110 could be one or several of any type of imaging sensors, for example a video imaging camera, a thermographic camera and/or a radar imaging sensor. For practical purposes, the imaging sensor is hereafter only referred to as the camera.

According to one or more embodiments, the camera 110 is adapted to electronically, and/or mechanically, tilt when a control signal representative of tilt is provided. Further, providing a control signal representative of pan may rotate the whole aircraft 10 in the horizontal plane, also known as yaw. Alternatively, the camera may be adapted to pan independently of the aircraft itself. An embodiment where panning is accomplished by yawing the aircraft is described in detail herein below, but there is no conceptual difference between panning, i.e. yawing, the aircraft itself and panning the camera and one may easily envision the camera rotating instead of the aircraft.

FIG. 1*a* illustrates an UAV system 100 according to an example embodiment seen from the side with a horizontal plane running through the center C of the camera 110. Further, the direction of the camera 110 is in FIG. 1*a* illustrated as pointing down at the angle β. The figures illustrate a quadcopter, a rotary wing aircraft 10 with four rotors 12 and a camera 110 suspended beneath the body of the UAV. However, the disclosed embodiments may be included in several rotary winged designs, and any rotary wing design containing a camera may have been used to illustrate the solution.

Figure 3:
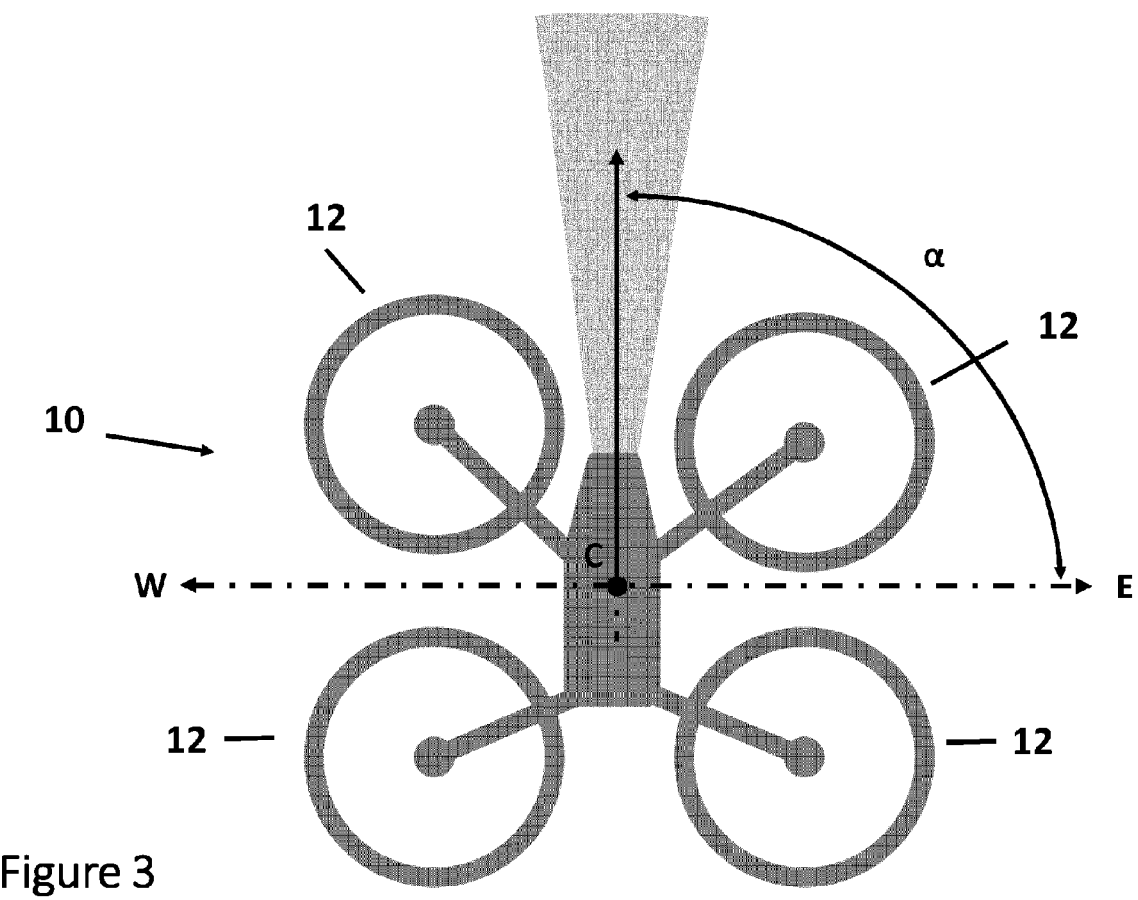
FIG. 3 schematically illustrates embodiments of an UAV system according to one example embodiment, seen from above, with the E-W axis running through the center of the camera. The camera direction is shown as pointing perpendicular at the angle $\alpha$.

FIG. 3 illustrates a UAV 10 according to one example embodiment of the present invention seen from above, with an East-West (E-W) axis running through the center C of the camera 110, between the four rotors 12. Due to the capabilities of rotary winged aircraft and the extent of the presented invention, this axis system is chosen purely to illustrate independency from the heading and orientation of the aircraft. In other words, the axis E-W illustrates a fixed direction, regardless of the orientation of the aircraft 10 and camera 110. In FIG. 3, the camera angle α is shown as pointing perpendicular to the axis E-W.

Figure 2:
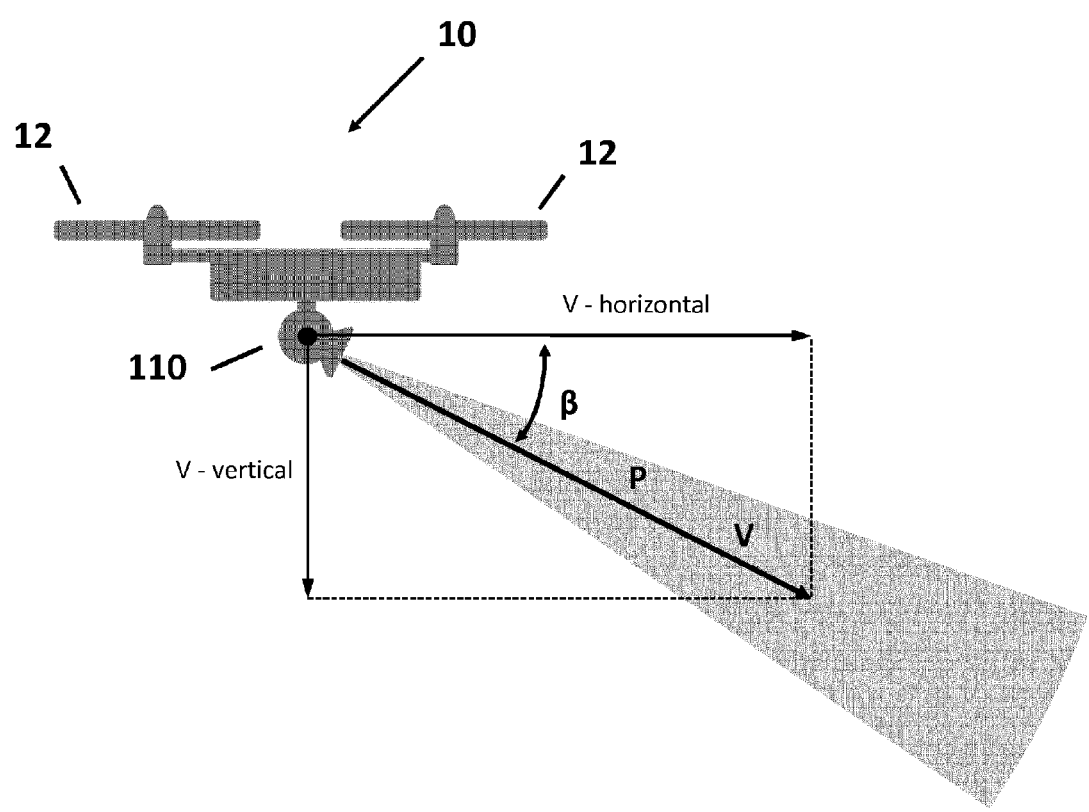
FIG. 2 schematically illustrates embodiments of an UAV system according to one example embodiment, seen from the side. The camera direction is pointing down at the angle $\beta$, further illustrating the vector composition to calculate the magnitude of climb or descend.

The UAV system 100 according to the present invention comprises positioning means 104 adapted to monitor the camera angle β measured in a vertical plane running through the camera axis as shown in FIG. 2. Further, the positioning means is adapted to monitor the angle α of the camera 110 in the horizontal plane in relation to the E-W axis, as schematically illustrated in FIG. 3. The positioning means 104 is also in the following referred to as the positioning device. The positioning means 104 is adapted to communicate these angles to the navigation means 106.

The positioning means 104 is further adapted to read and monitor the aircraft's horizontal position, height, flight direction, and horizontal and vertical velocity. The positioning means 104 is also adapted to communicate these values to the navigation means 106. According to one embodiment, the positioning means 106 may for example be a GPS sensor with additional navigational sensor capabilities, an autopilot with sensor capabilities, or other positioning means capable of the described features.

Figure 5:
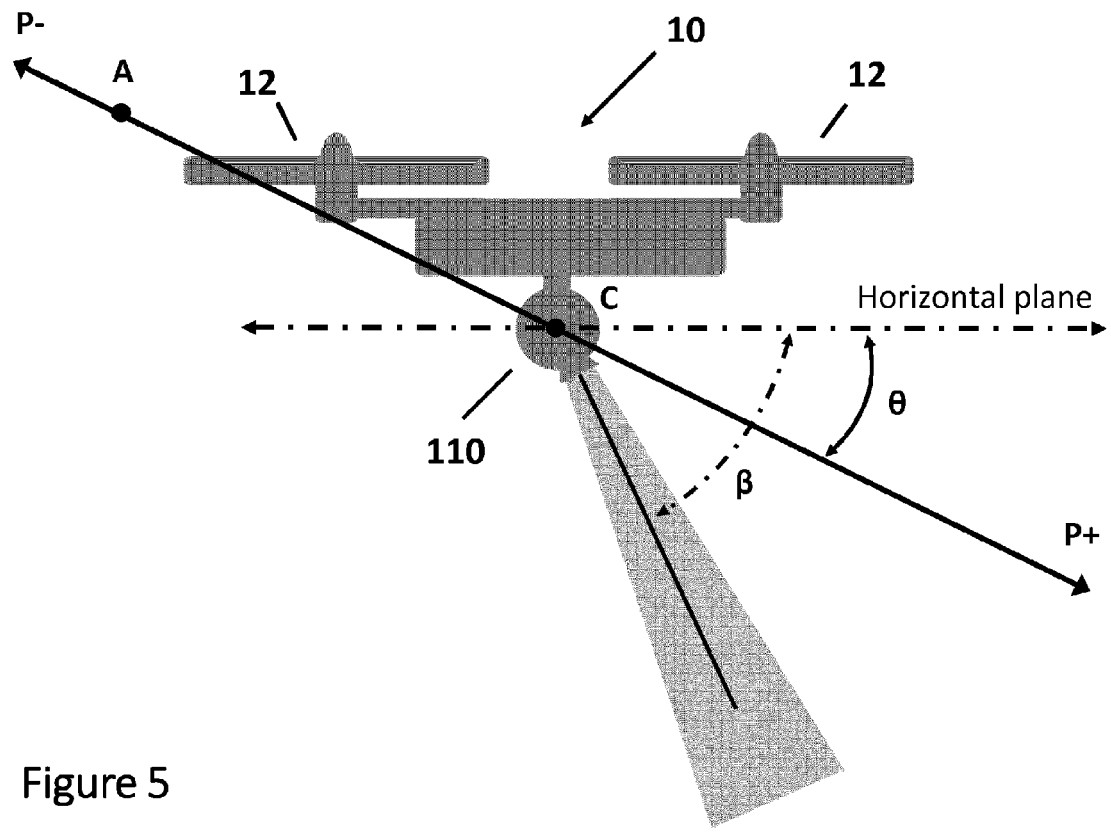
FIG. 5 schematically illustrates embodiments of an UAV system in flight according to a first flight mode of the example embodiment, seen from the side. The first flight mode have been enabled at point A, and the aircraft navigates along the path P.

The navigation means 106 is adapted to create a virtual flight path P through the center C of the camera 110. The flight path P is a straight line aligned with a camera orientation axis, typically, but not necessarily, the center axis of the camera 110, with P+ in the direction the camera 110 is looking, i.e. positive direction forwards, and P− pointing in the opposite direction, i.e. negative direction backwards, as illustrated in FIG. 5. According to one embodiment, the navigation means 104 may for example be an autopilot with sensor capabilities. In some embodiments the positioning- and navigation means, and their associated capabilities, are comprised within the same device which may for example be an autopilot with sensor capabilities. In some embodiments the receiving means 102, positioning means 104, navigation means 106 and transmitting means 108 may also be comprised within the same device.

By a control signal from the pilot, e.g. by a control signal transmitted from the remote operating system 200 to the UAV system 100, the navigation means 106 may establish a flight path P and a starting point A, representative of the center of the camera 110 at the given instant. Further, according to one embodiment of the invention, the navigation means 106 is adapted to maneuver the aircraft 10 in accordance with a predefined flight mode from this starting point A. The navigation means 106 may thereby also be thought of as a direction provisioning device, and may also be referred to as the direction provisioning device in the following.

The present embodiments describe, but is not limited to, two flight modes, as to be explained. The aircraft 10 may further comprise of a first determining means 114, adjusted to determine whether the UAV system is in a first or second flight mode and communicate these to a mode activation mean, that may enables the flight mode. The first determining means 114 is schematically illustrated in FIG. 1*b*.

The distribution of tasks, the capabilities, of the positioning and navigation means is only meant for illustrative purposes, and is examples of how different tasks in the present method for maneuvering an aircraft may be organized. In alternative embodiments of the present invention, tasks may be organized differently without influencing the new and innovative steps of the present invention. It should also be understood that in some embodiments the receiving means 102, positioning means 104, navigation means 106 transmitting means 108 may be combined into a single means.

"Locked Path Flight Mode"

Figure 6:
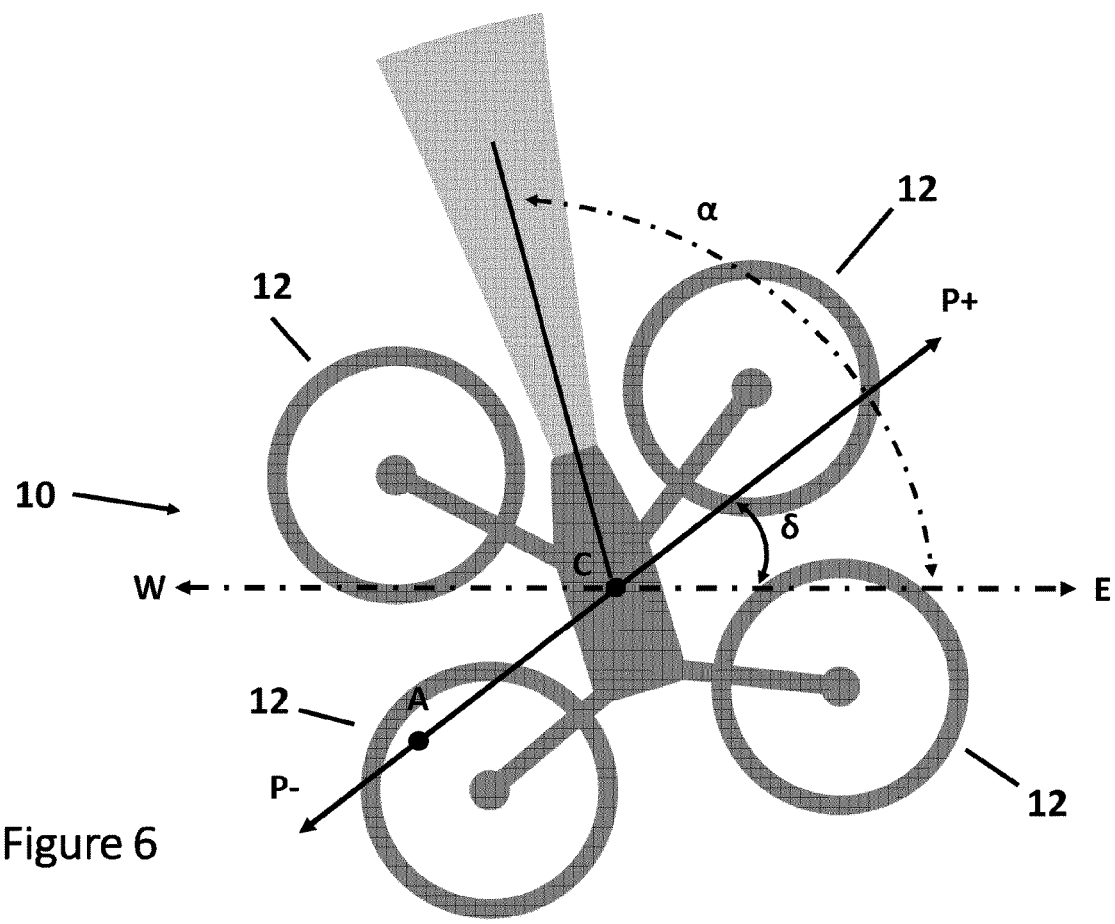
FIG. 6 schematically illustrates embodiments of an UAV system in flight according to a first flight mode of the example embodiment, seen from above. The first flight mode have been enabled at point A, and the aircraft navigates along the path P.
Figure 7B:
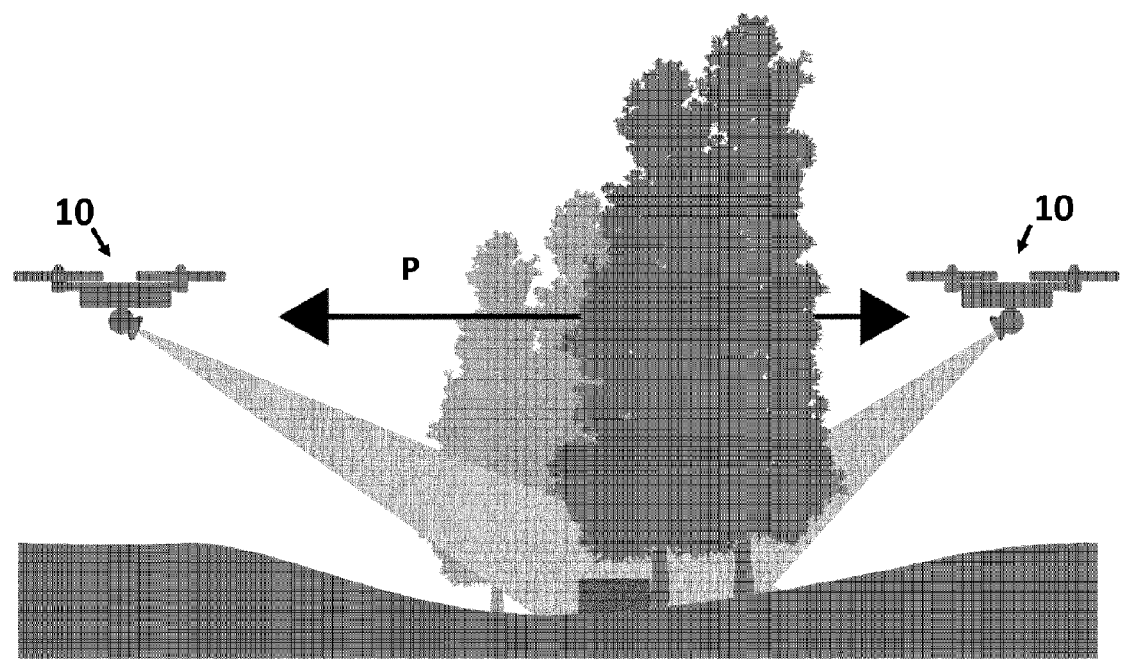
FIG. 7b schematically illustrates embodiments of an UAV system in flight according to a first flight mode of the example embodiment, seen from the side.

A control signal representative of a first flight mode provided by the pilot enables a first flight mode, also referred to in the present document as the "Locked path flight mode". According to the first flight mode of the present embodiment, the aircraft 10 maneuvers along a locked flight path P, determined by the vertical angle β of the camera 110 and the heading of the aircraft 10 at the instant the control signal was provided, cf. e.g. FIG. 2. The vertical angle β of the camera 110 is sometimes herein referred to as the vertical camera angle β. The heading of the aircraft here implies the direction of the camera 110. Once the first flight mode is enabled, the aircraft 10 may further rotate and tilt the camera 110 independently without deviating from movement along the locked flight path P. With reference to FIG. 5 through 7, the first flight mode will be discussed in more details in the following.

The positioning means 104 is adapted to read and monitor the position of the aircraft 10 relative to a starting point A while it is moving along the flight path P at the angle θ in the vertical plane. The angle θ may sometimes herein be referred to as the vertical flight path angle θ or as the vertical movement angle θ. The angle θ is initially defined by the vertical camera angle β at the instant the flight path P was locked. The positioning means 104 is also adapted to read and monitor the position of the aircraft relative to a starting point A while it is moving along the flight path P at the angle δ in the horizontal plane. The angle δ is initially defined by the horizontal camera angle α, the heading of the aircraft, at the time the flight path P was locked. The angle δ is sometimes herein referred to as the horizontal flight path angle δ or as the horizontal movement angle δ. The positioning means 104 is further adapted to communicate these values to the navigation means 106.

Further, the first flight mode may comprise the following actions from the instant a control signal is provided, e.g. from the point of time a control signal is received in the UAV system; the first determining means 114 determine the current flight mode, and communicate these to a mode activation mean, that may enable the flight mode. The positioning means 104 further establishes a starting point A, representative of the center C of the camera 110 at the given instant. The positioning means 104 reads the angles α and β of the camera 110 and communicates these to the navigation means 106. The navigation means 106 determines the angles α and β as the angles δ and θ of the flight path. The navigation means further establishes the locked path P; defined by the angle δ in the horizontal plane, shown in FIG. 6, and the angle θ in the vertical plane, shown in FIG. 5.

As mentioned, the first flight mode control signal implies that once enabled, the operator may now navigate the aircraft 10 along the path P by virtue of further throttle control signals, but tilt the camera 110 and pan the aircraft 10 independently to investigate POIs along the path. According to the described example embodiment, the positioning means 104 continuously read and monitor the current position of the aircraft 10 and communicates these to the navigation means 106, to ensure that the aircraft 10 continues on the decided path P at the angle δ and θ. Further, the positioning means 104 continues to monitor the angle α and β of the camera in the event that, for example, a new flight mode control signal is provided.

Figure 4A:
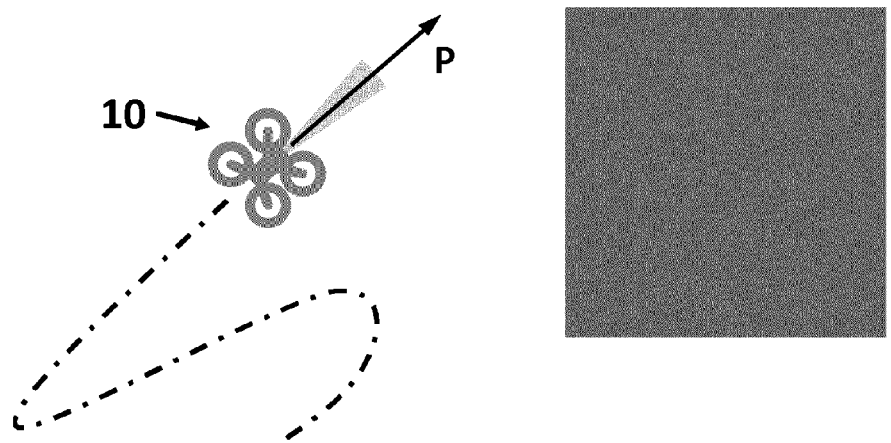
FIG. 4a schematically illustrates embodiments of an UAV system in flight according to a second flight mode of the example embodiment, seen from above.
Figure 4B:
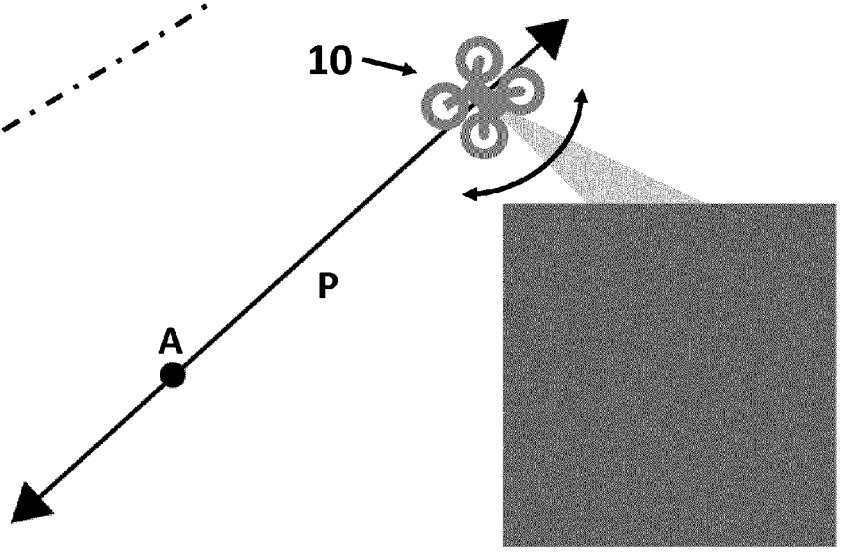
FIG. 4b schematically illustrates embodiments of an UAV system in flight according to a first flight mode of the example embodiment, seen from above. The first flight mode have been enabled at point A, and the path P locked.

FIG. 4b illustrates a practical implementation of the present embodiment according to a first flight mode. Through the live images transmitted, the pilot has identified a point of interest (POI) C1 shown in FIG. 4b which needs further investigation. The pilot provides a control signal to the aircraft 10 to set a path P in the direction the camera 110 is pointing, engaging the first flight mode. The first determining means 114 determines the current flight mode, communicates this to the mode activation device that enables the flight mode. The positioning means 104 establishes this as a starting point A, reads the angle α of the camera 110 in the horizontal plane, and the angle β of the camera 110 in the vertical plane, and communicates these to the navigation means 106. The navigation means 106 use these inputs to define the new flight path P of the aircraft 10 and locks this as the direction of flight. This is illustrated by the straight, solid, line in FIG. 4b indicating the locked flight path P as compared to the curved, dotted, line in FIG. 4a indicating an un-locked flight path P. In other words, the values α, β at the instant the control signal is received is established as the angles δ and θ, providing the direction of the path P in relation to the E-W axis and the horizontal plane. The pilot can now navigate along the path P by further throttle control signals, while the control signals representative of pan and tilt, tilts the camera 110 and rotates the aircraft 10 in order to investigate C1.

While on one path P, if the pilot through the transmitted images detects a new direction of interest, a repetition of the above-described example takes place. For example, once around C1, the pilot observes a new POI that needs investigation. As illustrated in FIG. 7a, the pilot observes two trees and a clear direction of flight between them. The pilot further orientates the camera 110 so that the center of the viewed image is between these two trees, and again provides a control signal representative of the first flight mode. The control signal initiates the positioning means 104 to establish a new starting point A. The positioning means 104 further reads the angles α and β in relation to the E-W axis in the horizontal plane and in relation to a horizontal reference in the vertical plane, and communicates these to the navigation means 106. The navigation means 106 defines this as the new locked path P of flight. Operating the control signals representative of throttle now navigates the aircraft along the new path between the two trees. As explained, the aircraft 10 and camera 110 is free to pan and tilt independently from the aircrafts direction of flight, and the pilot is able to maneuver the camera while moving the aircraft back and forth along the path P, as illustrated in FIG. 7.

As soon as the new locked path P is set, the pilot may maneuver the camera 110 independent of the aircraft 10 general orientation and heading. The pilot is able to survey a POI and is, with minimal efforts, able to maneuver the aircraft 10 along the defined path, thereby increasing the operational capability.

A person skilled in the art would appreciate that the nature of rotary winged UAVs implies that no efforts to rotate or adjust the heading of the aircraft itself is necessary between different paths. Thereby the flight path P may deviate from the main axis and heading of the aircraft.

"Camera Tracking Flight Mode".

If a situation that, for example, requires the aircraft to move more freely from the current position, another control signal from the pilot may cancel the "locked path flight mode" and a control signal representative of a second flight mode from the pilot enables a second flight mode; "camera tracking flight mode". The physical device from where the control signal is provided by the pilot via the remote operating system 200 to activate the second flight mode is in the present document also referred to as the mode activation device.

According to the second flight mode of the present example embodiment, the aircraft tracks the camera's movement and maneuvers the aircraft thereafter. The first determining means 114 determines the flight mode control signal and communicates these to the mode activation device that enables the flight mode selection. The positioning means 104 reads and communicates the velocity of the aircraft and the angles α and β of the camera 110 to the navigation means 106. In some embodiments, the navigation means 106 further steers and navigates the aircraft according to the velocity and camera positions received. In other words, in this second flight mode the flight path P and the starting point A is continuously and automatically updated every time the direction of the camera 110 changes, also if the aircraft is already flying through the air. E.g. if the camera is tilted further down, a new flight path P, representative of the new camera direction, is created and the pilot can maneuver along the new path P. The present flight mode continues, and the first determining means 114 continue to determine the present flight mode and communicate these to the mode activation device, until a control signal that ceases the flight mode is provided.

Hence, according to some embodiments, a control signal from the remote operating system 200 representative of pan, rotates or turns the aircraft 10 horizontally left or right. This implies that if the aircraft 10 is stationary, the aircraft 10 simply rotates horizontally on its own central vertical axis. However, if the aircraft 10 is moving forward or backward in the horizontal plane, i.e. the camera 110 is orientated straight forward, β=0, the control signal representative of pan control may turn the aircraft 10 in the desired direction and establish a new direction of flight in the horizontal plane. In a practical implementation, the aircraft 10 will then follow an arc, which radius is defined by the forward speed of the aircraft 10 and the magnitude of the pan control signal, yaw rate, as it would if one steered left or right in a conventional remote controlled aircraft. In this example, the positioning means 104 may have updated the flight path P a number of times throughout the whole maneuver, and when the control signal to turn is ceased the aircraft will continue along the last flight path P is generated, until a new instruction is sent to the aircraft 10.

If a control signal from the remote operating system 200 representative of camera tilt is provided, a similar scenario takes place. The vertical movement of the aircraft is determined by the angle β of the camera 110 and the speed V of the aircraft, e.g. the magnitude of the throttle control signal. Determining the vertical component, i.e. vertical speed, is then a matter of vector composing as illustrated in FIG. 2. It is important to note that the aircraft 10 will remain generally horizontal in any implementation of the present invention, and when following a flight path that is not horizontal, the aircraft 10 will climb or descent with the body of the aircraft horizontally oriented.

In FIG. 2, the velocity vector V-horizontal illustrates the horizontal speed and the vector V-vertical illustrates the vertical speed of the aircraft 10, these speeds is, as mentioned known to the positioning means 104. Similarly, the camera angle β is monitored by the positioning means 104, and these values is continuously communicated to the navigation means 106. The navigation means 106 may then determine any changes in the vertical component or the horizontal component resulting from a change in total speed, provided by the throttle control signal, and/or the camera angle β. For example, if a tilt control signal is provided while the aircraft is stationary without any throttle input, the total velocity vector V equals 0. Hence, the vertical component equals 0. The aircraft will then remain stationary without affecting the altitude and only tilt the camera. However, if the aircraft was stationary with the camera 110 oriented straight down, and positive throttle was provided, the aircraft 10 would descend straight down. Likewise, if the camera 110 were oriented straight ahead, there would be no vertical component. Applying throttle here would simply move the aircraft 10 along a horizontal axis.

If the aircraft 10 is moving horizontally at a certain speed, and a continuous camera tilt control signal is provided, the vertical movement would be the product of the angle β and the velocity vector, as shown in FIG. 2. As the camera angle β increases, the flight path P is continuously updated, resulting in the vertical component V-vertical increasing and the horizontal component V-horizontal decreasing. For an onlooker, the aircraft 10 would then follow a flight path that is curved downwards. When the camera tilt control signal stops, the aircraft 10 will continue forward and downwards following the last updated flight path P until a new camera control signal or a change in throttle is provided via the remote operating system. Due to the nature of rotary wing aircraft, the whole change in vertical flight direction may be accommodated while the aircraft keeps a generally level attitude.

FIG. 4a illustrates a practical implementation of the present embodiment according to a second flight mode. In this example embodiment, operating the throttle moves the aircraft 10 towards or away from the objects viewed on the pilots display 202, and providing control signals representative of pan enables the pilot to maneuver the aircraft 10 as desired, indicated by the dotted line.

According to another aspect of the example embodiment described here, the second flight mode may also incorporate other definition modes for easier operation. For example, another feature within the second flight mode may lock the height of the aircraft 10, thereby making it possible to tilt the camera 110 without altering the altitude of the aircraft 10 when throttle is applied. In this example embodiment, the aircraft 10 may still rotate as described earlier by control signals representative of pan. In another embodiment, a feature within the second flight mode may lock the vertical speed of the aircraft 10, thereby making it possible to fly the aircraft 10 at a fixed speed.

A person skilled in the art would, again, appreciate that the nature of rotary winged UAVs implies that no efforts to rotate or adjust the heading of the aircraft itself is necessary between different flight modes or different paths.

General Notations

As previously mentioned, in some embodiments, the aircraft 10 may be equipped with a camera 110 that comprises mechanically and/or electronically tilt and pan functionality. This added pan functionality imply that during the first and second flight mode, the aircraft 10 will not rotate equivalent of the provided pan control signal, but actually pan the camera instead. The operation would however be identical to the above described example embodiment, with the exception that the aircraft's heading remains stationary relative to the E-W axis. A person skilled in the art would again appreciate that the nature of rotary winged UAVs implies that no efforts to rotate or adjust the heading of the aircraft 10 itself is necessary between different flight modes or different paths.

In some embodiment of the invention, the cursor may also be movable within the display independent of the camera movement. A control signal from the remote operating unit representative of the first flight mode may also then initiate a fixed path P. Since the cursor is then not positioned in the center of the display, i.e. equal the camera direction, a second determining means 116 may then determine a current target point corresponding to an image point to which the cursor currently is pointing in the image relative to the actual camera angle and communicate these to the navigation means 106. This means is only active and the action only initiated if the cursor is moved out of the center of the display.

In some embodiments, the aircraft 10 may be equipped with distancing means 112. The distancing means 112 may be comprised in the UAV system 100 as schematically illustrated in FIG. 1*b*. The distancing means 112 may be adapted to measure the distance to structures in the proximity of the aircraft 10. The distancing means 112 is further adapted to provide a "stop" control signal to the navigation means 106 if they measure a structure within a defined threshold distance. If the aircraft maneuvers close to the structure, the distancing means 112 communicate a warning to the pilot, e.g. to the remote operating system 200, by virtue of the transmitting means 108 of the UAV system 100 to the. If the aircraft is, for example in the second flight mode, this warning may define the end of the path P. The aircraft can however still go back and maneuver through the rest of the defined path P. According to one alternative embodiment of the invention, the distancing means 112 may comprise sensor capabilities, e.g. one or several infrared sensors. Alternatively, this sensor could be one or multiple laser sensors, radar sensors, ultrasonic sensors or any other relevant sensors or method capable of calculating distance to an object, e.g. a monocular depth measurement system.

In some embodiments of the present invention, tasks may be organized differently without influencing the new and innovative steps of the present invention. It should also be understood that in some embodiments the receiving means 102, positioning means 104, navigation means 106 transmitting means 108 may be combined into a single means.

The invention claimed is:

1. A method for maneuvering an aircraft using an autopilot, a camera coupled to the aircraft, and a display configured to display an image captured by the camera, the method comprising:
   detecting a first position of the camera;
   determining a first direction from the first position of the camera directed towards a first target point, wherein the first target point corresponds to an image point within the image displayed by the display;
   if a flight mode of the aircraft comprises a locked path flight mode:
      maneuvering the aircraft according to a speed control signal and substantially along a locked flight path, wherein the locked flight path is defined, at least in part, by the detected first position and the determined first direction, and
      allowing the camera to tilt and/or pan freely substantially without disrupting the maneuvering of the aircraft along the locked flight path; and
   if the flight mode of the aircraft comprises a camera tracking flight mode:
      maneuvering the aircraft according to the speed control signal and substantially along a dynamic flight path starting substantially at the first position and defined, at least in part, by subsequent detected positions of the camera and/or corresponding determined directions and/or target points.

2. The method of claim 1, further comprising:
   determining the flight mode for the aircraft.

3. The method of claim 1, wherein:
   the image point is indicated by a cursor projected on the image displayed by the display; and
   a position of the cursor relative to the display is fixed or movable within the display.

4. The method of claim 1, wherein the speed control signal comprises control signals representative of throttle.

5. The method of claim 1, wherein the speed control signal comprises control signals representative of a vertical speed of the aircraft and/or a horizontal speed of the aircraft, and wherein the vertical speed or the horizontal speed are fixed during the maneuvering the aircraft along the locked and/or dynamic flight paths.

6. The method of claim 1, wherein the speed control signal comprises control signals accommodating a proximity of structures to the aircraft and/or along the locked and/or dynamic flight paths.

7. The method of claim 1, further comprising:
   panning the camera by yawing the aircraft during the maneuvering the aircraft along the locked and/or dynamic flight paths.

8. The method of claim 1, further comprising:
   activating and/or switching between the locked path and/or the camera tracking flight modes using a mode activation device.

9. The method of claim 1, wherein:
   the camera comprises one or more infrared sensors.

10. A system configured to maneuver an aircraft, the system comprising:
    a camera coupled to the aircraft and configured to communicate with a display, wherein the display is configured to display an image captured by the camera; and
    an autopilot coupled to the aircraft, wherein the autopilot is configured to:
       detect a first position of the camera;
       determine a first direction from the first position of the camera directed towards a first target point, wherein the first target point corresponds to an image point within the image displayed by the display;
       if a flight mode of the aircraft comprises a locked path flight mode:
          maneuver the aircraft according to a speed control signal and substantially along a locked flight path, wherein the locked flight path is defined, at least in part, by the detected first position and the determined first direction, and
          allow the camera to tilt and/or pan freely substantially without disrupting the maneuvering of the aircraft along the locked flight path; and
       if the flight mode of the aircraft comprises a camera tracking flight mode:
          maneuver the aircraft according to the speed control signal and substantially along a dynamic flight path starting substantially at the first position and defined, at least in part, by subsequent detected positions of the camera and/or corresponding determined directions and/or target points.

11. The system of claim 10, wherein the autopilot is further configured to:
    determine the flight mode for the aircraft.

12. The system of claim 10, wherein:
    the image point is indicated by a cursor projected on the image displayed by the display; and
    a position of the cursor relative to the display is fixed or movable within the display.

13. The system of claim 10, wherein the speed control signal comprises control signals representative of throttle.

14. The system of claim 10, wherein the speed control signal comprises control signals representative of a vertical speed of the aircraft and/or a horizontal speed of the aircraft, and wherein the vertical speed or the horizontal speed are fixed during the maneuvering the aircraft along the locked and/or dynamic flight paths.

15. The system of claim 10, wherein the speed control signal comprises control signals accommodating a proximity of structures to the aircraft and/or along the locked and/or dynamic flight paths.

16. The system of claim 10, further comprising:
panning the camera by yawing the aircraft during the maneuvering the aircraft along the locked and/or dynamic flight paths.

17. The system of claim 10, wherein the autopilot is further configured to:
activate and/or switch between the locked path and/or the camera tracking flight modes using a mode activation device.

18. The system of claim 17, further comprising:
the mode activation device.

19. The system of claim 10, further comprising:
the display.

20. The system of claim 10, wherein:
the camera comprises one or more infrared sensors.

\* \* \* \* \*